July 8, 1924.

P. E. CHAPMAN 1,500,181

ARMATURE AND COIL WINDING MACHINE

Filed Dec. 14, 1914

Inventor:
Penrose E. Chapman

July 8, 1924.
P. E. CHAPMAN
ARMATURE AND COIL WINDING MACHINE
Filed Dec. 14, 1914
1,500,181
2 Sheets-Sheet 2
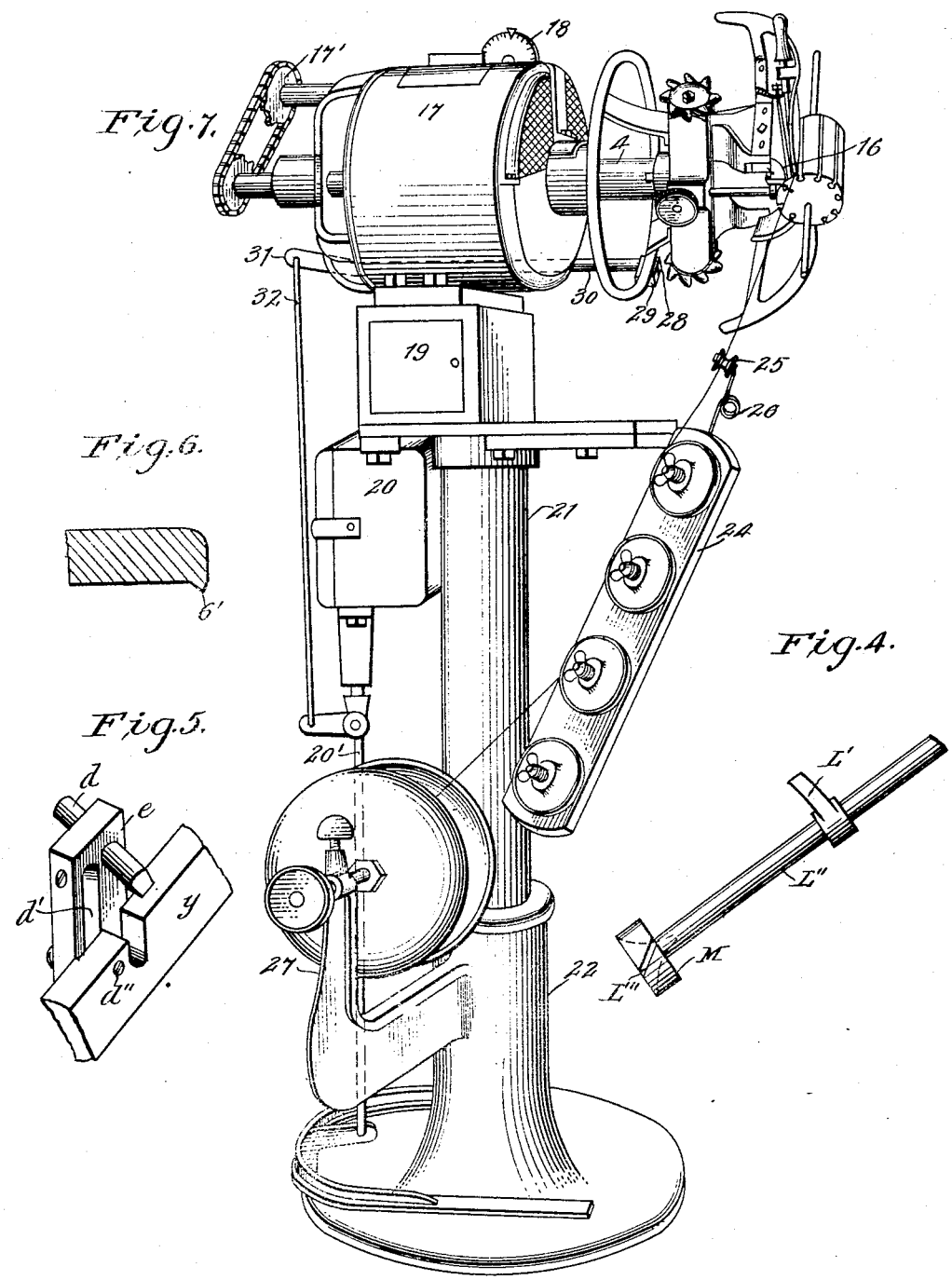

Patented July 8, 1924.

1,500,181

UNITED STATES PATENT OFFICE.

PENROSE E. CHAPMAN, OF ST. LOUIS, MISSOURI.

ARMATURE AND COIL WINDING MACHINE.

Application filed December 14, 1914. Serial No. 877,167.

*To all whom it may concern:*

Be it known that I, PENROSE E. CHAPMAN, a citizen of the United States, State of Missouri, city of St. Louis (whose post-office address is N. E. corner 10th and Walnut Streets, same city), have invented certain new and useful Improvements in Armature and Coil Winding Machines, of which the following is a full, clear, and exact description, such as will enable others skilled in the art to which it appertains to make and use the same, reference being had to the accompanying drawings, forming part of this specification.

The improvements enumerated in this application are particularly useful on the types of armature winding machines known as universal i. e., intended to take a variety of sizes or styles, or both, but are not limited to use on universal machines, as many or all of these improvements are decidedly useful on rigid or non-universal machines, and coil winding machinery in general. This application is taken in connection with my Patent #1121798, December 22, 1914 on universal drum armature winding machines, this application growing out of, and is largely improvements upon the said armature winding machine.

While the features of this invention are shown in connection with bipolar armatures, many of them or all of them are useful and applicable to multipolar armature winding machines as for instance in connection with my Patent #874,163 of 12/17/1907, also many of them are applicable to internally wound armatures more commonly known as "stators." This invention is therefore not limited to the particular type or classes illustrated and described herein. The word "armature" in this application will be taken to mean not only bipolar armatures, but all other types of wound armatures as multipolar, stator (internal) etc. Many parts are also applicable to plain coil winding machinery.

The object of this invention is the elimination of the necessity for the "tail" mechanism (11 to 14) described in the Patent #1121798 referred to above.

And to raise the speed of operation, increase the speed of handling, and ease of setting, and increase the possible tightness of winding armatures, that is, increase the amount of wire that can be put into the slots of slotted drum armatures without pounding or with a minimum amount of pounding.

Increase adjustability or universality particularly with reference to armatures with twisted slots and extra long length of cores.

The quick formation of leads (for connecting commutator), and the twisting of the said leads eliminating the awkward hand forming and twisting of the said leads. Increase the capability of handling very delicately covered wires, such as wires covered with a single layer of very poor grade of silk fibre.

In the drawings Figures 1 and 2 are side elevation and plan of the winding machine, duplicate parts being largely cut away to save space. Owing to the complexity of curvatures of the "wings" or cams, this method of illustration is chosen in preference to perspective.

Figure 4 is a view of the tumbler of the lead twister shaft and wire handling fittings.

Figure 5 is a perspective of the key mechanism.

Figure 6 is a cross section of the improved jaw showing "finger nail" 6'.

Figure 7 is an elevation of a complete winding machine equipment.

W is the wire for winding the armature whose successive positions are disclosed by W' W'' W''' W''''.

Figure 1:
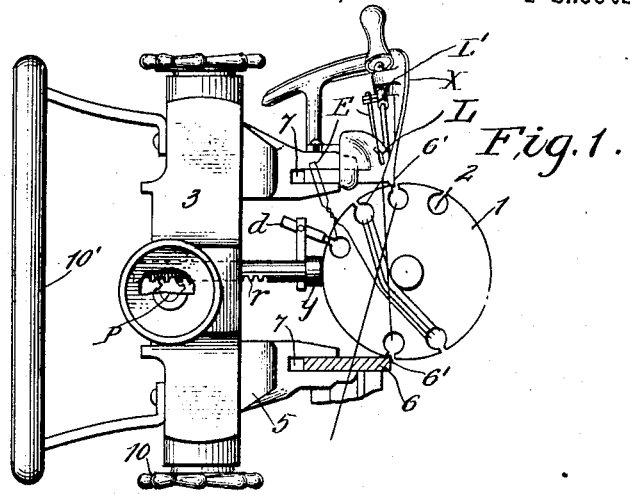
Figure 2:
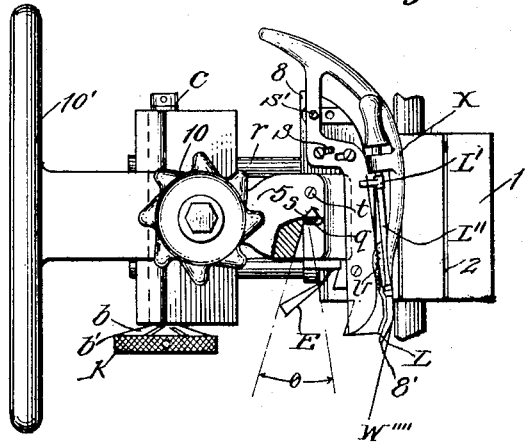
Figure 3:
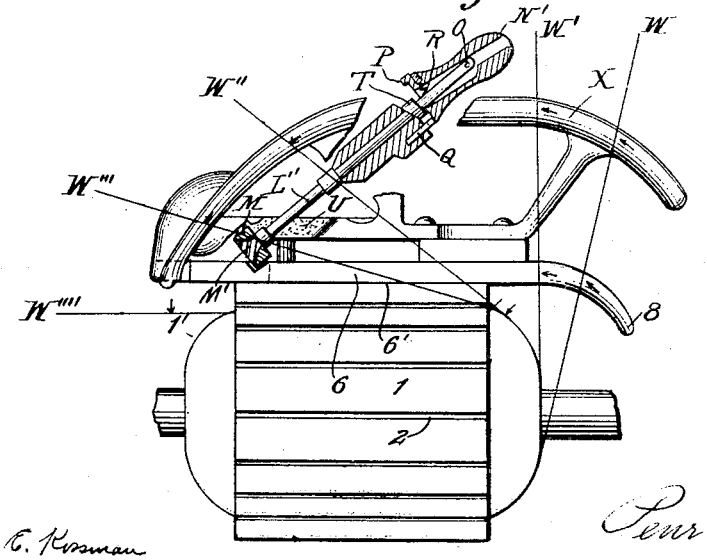
Figure 3 is a front elevation of the improved jaw with an armature in place.

1 is an armature core in position to be wound, in Figure 3 a "head" is diagrammatically shown in connection therewith.

X is the wire directing guide or cam which for brevity is herein called the "wing." A part is cut away in Figure 3 to show the bearing it carries to support tumbler shaft L''.

8 and 8' are wire directing guides now combined with jaw 6.

The tail mechanism described in previous Patent (No. 1,121,798) parts (11 to 14'') requires a lathe type of support and adds complications to the entire machine which it is highly desirable to eliminate, this, I accomplish in this invention by the simple expedient of forming a slight ridge or "finger nail" 6' shown in enlarged section in Figure 6 on the gripping edge of the jaws 6, or forming this edge with a decided negative bevel the "finger nail" being preferably beveled on the inner side. This simple expedient enables the chuck or head end to grip and hold securely any armature, even considerably off the center as in chord windings, this together with the fact that windings distributed on both sides of the shaft present no advantage electrically makes it possible to eliminate the said tail mechanism and its attendant expensive supporting mechanism. In order to prevent the edge 6' scoring the wire it is slightly beveled on the front side and the corners all well rounded and smoothed up.

The guides 8 in the old patent have been combined with the jaws 6, the slot holding the key 7 in the old mechanism, having been enlarged to take an entire jaw, said slot is here numbered the same (7) one of the combination jaws 6, 6 and guides 8 and 8' are therefore inserted in the slot 7 and secured in said slot in a manner to allow their being turned at an angle to align with armatures having twisted slots. These jaws have slots $s$ cut in their screw $q$ entering and loosely securing the said jaws 6 in the jaw bodies 5. After setting the jaws are secured in position by any suitable means as set screws $t$. For aligning the jaws 6 pressure is simply applied to their center to force them against the base line of slots 7 which are parallel.

The angle $\theta$ illustrates a selected range of angular adjustment of the jaws 6 and appurtenances.

For the sake of clearness the end of an armature slot 2 in which the wire W to W'''' enters first during winding will be called the "entering" end and the end wherein it enters last, the "tail" end, and that portion of the wire immediately next to the slot filling portion (see arrows next to characters W etc., Figure 3) on the supply or reel side i. e., next the "tail" of the slot will be called "beyond" that next to the "entering" end "ahead."

In all previous forms of winding machines there is a deformation of the wire produced as it passes over the wire directing guides, forms, fingers, or other handling device, part of this deformation being in that portion of the wire which lies in the slots, and always in such a direction as to bulge out, sometimes upwardly, and sometimes sidewise, or both and always in a manner to encroach on the winding room or space in the slots rendering the complete and tight filling of the slots a matter of some difficulty. It is therefore highly desirable to eliminate this tendency to bulge and render the slots more easily filled completely.

In order that the wire may lie flat on the bottom of the slots it is necessary that it have a negative or convex curvature imparted to that portion which is so to lie to counteract the leverage action around the corners which produces part of the bulge of the middle portions away from the bottom of the slot. This is also true with reference to side action.

This negative curvature can readily be given the wire in any direction as it is fed to the winding machine by passing it over some object as the fingers, a pulley, guide, etc., but must be preserved as it passes through the machine.

In this invention I accomplish this object by so forming the wire directing guides that the work of directing is not done on that portion of the wire which enters the slots or if so only to a degree that does not injuriously deform the wire. To this end the entering end 8 of the jaw 6 is curved towards the armature in such a manner that the wire which is presented to this surface is largely the wire which falls on the head near the corner or if in the slots at all directly on the corner of the coil at a place where it can do no harm. This will be evident on reference to Figure 3, at the arrows which show the successive positions of the wire W, in which drawing the wire is shown as assuming different positions, W W' W'' W''' W'''' for ease of illustration instead of the machine turning and the wire being held stationary in space as is actually the case. The arrows at the entering end show the active or deflecting points of contact of the jaw end 8 with the wire and the position on the armature of these points showing that they do not enter the slot or only do so on the corners, and also on the wings X the arrows portray successive points of contact of the wire W therewith. The guide 8 on that end of the jaw is cut short as it is useful only for unwinding. This takes care of the wire on the entering corner of the armature only. To take care of the wire on the tail corner of the armature the guide X which for clearness we call the "wing" is superimposed on and over the jaw 6 and guide 8. This wing has a rail X which at the entering extremity is bent away from the armature, and is so proportioned and curved that the wire is caught and directed by it at a point beyond that which will lie in the armature slot, and as the initial entry into the slot is produced by the guide 8 as described above, ahead of the slot filling portion there is little or no deformation of the slot filling wire and it may therefore have imparted to it any suitable curvature without having said curvature eliminated in passing through the machine. A curvature towards the winding side of slot, and towards the bottom will not only make the wire lie down snugly in the bottom of the slot but also hug the side i. e. a curvature imparted in the right direction will make the wire lie snugly in the slot reducing objectionable bulge or belly.

Owing to the different positions of the wire across the head in different windings as in chord and diametrical windings it is desirable that the wings X be adjustable laterally. This may be done in any suitable way, but is here shown as adjustable by the slots $s''$ which permit of lateral adjustments, the wing X being pivoted around a pin or screw at the other end. Wing X may be in any form which will accomplish the purpose of preserving the form of the slot filling wire W, i. e., direct the wire in to the slot without deforming it, it may be a solid plate but the form selected is preferred.

The wing X has all changes of angles and curvatures made as near as possible on the lines of a spiral as witnessed in a well laid out railroad curve, this is also true of the guides 8 of the jaw 6.

This wing device greatly improves the speed and smoothness of action of the winding machines, and renders it possible to put considerably more wire in a slot without pounding.

In order to impart the "negative" curve to the wire described above I prefer to run it under and around a small pulley 25 whose core is small enough to impart the required curvature, this pulley is best mounted on a spring 26 set so as to slightly take up irregularities of pull due to the irregularities of the armature core.

In order that armatures with extra long cores may be wound, the wings X are provided with a plurality of fastening holes $S'$ some of which are omitted in the drawing for the sake of clearness, in such a manner that they may be set forward on the jaw 6 which has a plurality of slots $s''$ (only one is shown) for recentering the entire jaw and wing.

A snubbing pin $L'$ is provided which may be a projection or a shoulder, but whose preferred form is a pin of angular cross section as the starting end of wire W may be "snubbed" around such a pin by simply taking a couple of turns and pulling tight. This simple device operated in this simple manner will hold more than the tensile strength of the wire W when the pin $L'$ is properly proportioned.

As the forming of the leads of an armature is an awkward job at best, a device which will form the said leads is desirable, and I accomplish this end by providing lead directing guides by cutting the slot L in the jaw 6 at a point where it will be nearly at the middle of the armature tooth held by the jaw 6. The wire W is then carried up through this slot L under the pin $L'$ forward and over it, then is hooked over the pin $L'$ from underneath and back down through the slot L. When the next coil is formed, the lead E is flipped off the pin $L'$ pulled down out of the way and the next one formed, or more than one lead may be formed before releasing. The slot L therefore locates the base or origin of the armature lead. Locating the pin $L'$ towards the rear of the armature (assuming the commutator end to be the front) presents some very great advantages in that the lead forming wire as it trails off or returns from the pin $L'$ will lie snugly against the head of the armature without additional parts to compel it to do so.

The form of lead just described is all that is necessary or desirable if the wire is comparatively heavy, but when it is light the wire is not stiff enough to support itself in position when released, and needs to be twisted, this I accomplish by mounting the pin $L'$ on a tumbler shaft $L''$ which has a driving handle $N'$ at its extremity for turning, and at its lower end in close juxtaposition to the slot L, a slot $L'''$ in the head of tumbler M said slot therein being set at sufficient angle to slightly grip or "bite" the wire W as it is laid through it, the said slot being interposed in the path of the wire when it is looped over the pin $L'$. The general style of the tumbler head shown is preferred because it has no small parts to get out of order. It may have a single slot or a purality or may be cut at a plurality of angles as shown in Fig. 4 at $L''$.

After the wire is looped over the pin and down through the slot $L'''$ the loop may be twisted by rotating the tumbler shaft, $L''$ simply passing the hand over the handle $N'$ doing the work.

As the wire has a tendency to twist at or near the point of imparting the said twist (the head M) and even inside of the slot and as it is desirable to have said twist as close to armature as possible, I provide the tumbler M with a face $M'$ which (in this case) is a flared cavity provided with corrugations which are preferably spirally placed in such a direction that as the device is rotated the wire will be rubbed by the said face $M'$. The spirals have a tendency to lead the twist downwardly i. e., nearer the armature.

A lock of any suitable construction may be provided to align slot $L'''$ in tumbler $L''$ with those in the jaw and wings for slots or guides are provided as L to guide the wire in to the tumbler M.

The form of lock shown in Figure 3 at end of $N'$ is a preferred form for it has advantages of a positive and rigid lock when locked and an easy, and to the operator unconscious unlock which remains completely unlocked and free from drag until released for relocking. Its operation and construction is very simple. The handle $N'$ is pivoted at the point O and is so suspended on the tumbler shaft $L''$ as to be free to swing on this pivot through a limited travel, the flange P of the handle being notched to fit over the pin Q which is so placed that when the slot in the handle flange P is over it the entire tumbler shaft and appurtenances are in correct alignment. A spring R is provided in a suitable manner to hold the handle N' over the pin Q and keep it locked while not in action. A pressure applied to the handle N' opposite the slot in the flange P causes said handle to recede and throw the said flange out of line with the pin Q unlocking it and allowing it to be turned by passing the hand over the said handle. At the desired number of revolutions the pressure of the hand is transferred to the tip of the handle which causes the slot in flange P to lock over the pin Q at the correct position. A little practice renders this easy.

When the lead E is twisted the wire naturally tightens on the pin L' considerably, being shortened by the twisting, rendering it rather difficult for this loop to be released. To overcome this difficulty I use two methods. The upper edge of the pin L' is formed on a radius from a center somewhere near the slot L'''' in the head M whose center is thrown a little bit off to one side, in order that the radius may not follow truly around the slot L''', but will release slightly as the wire is slid over it towards the end. The second point for overcoming this difficulty is the collar T whose face is not square, but has its lower face, i. e., the face which is presented to the end of the bearing on X holding the shaft U made at a slight angle, likewise the bearing shoulder is made to correspond to it. The angles are so set that at the point of half revolution they will have moved the shaft L'', and appurtenance away from the source of the wire W thus slightly stretching it, returning to the original or minimum position at the locking point, leaving the wire sufficiently stretched to come off.

It would of course be an advantage to have the lead insulation scraped off at the points where they are to connect to the commutator coincidently with their formation, to accomplish this end, I insert any suitable abrasive material as sandpaper, knife-edges, file, etc., in juxtaposition to the path of motion of the said leads (as at U) as they are twisted, in a manner that said abrasive will contact with said lead in its motion and thereby abrade said insulation, thus accomplishing two operations at once.

The back stops 9 in the previous patent are superseded by a rack and pinion stop, the racks r now take the place of the pair of screws and are joined at their outer ends by the yoke y thus closing the gap between the old heads, and rendering the machine capable of taking shorter cores. The pinion p engages both racks, it being supplied with the collar c on one end and the knob k on the other. This knob is combined with a brake formed in this case by the dished spring washer b and its liner of suitable material as fibre b'. The action of this device is of course immeasurably faster than the old screw stops; the brake holding the stops in any position in which they are set.

For some kinds of work as manufacturing, a key is desirable to locate the slots 2, therefore I have added to the yoke y a key or stop d adapted to fit in a slot 2 of an armature 1, and locate it with reference to the jaw 6. This stop is held by a carrier e which in turn is held through its slot d' by a screw d or any other suitable means to the yoke y.

To facilitate handling a hand wheel 10' is supplied with which to control the rotation etc., of the winding machine. A ratched or directionated notched knob, hand wheel or wrench as it might variously be called 10 notifies the operator by the sense of touch and sight what direction to turn the right and left handed lead screw (not shown) irrespective of which end of it is presented. The knob is proportioned to facilitate twisting in the direction of tightening, has been substituted, for the knurled one of previous machines. Because of the very high speed at which these improvements make this device capable of working, it is desirable that it be combined with several items, and I have therefore produced the following combination.

The best drive is by electric motor, I therefore mount the machine on a motor 17 by means of face plate 4, and attach to the motor, a revolution or turn counter 18 of conventional form by gearing 17', I mount this on a subbase 19 which in this case has a tool box 19', and a tool pan 19'', and which may be mounted on a column 21 as shown. I prefer the column 21 to telescope into base 22. A controller 20 is provided for handling the motor and a pedal 23 for handling the controller, through link 20'.

Owing to the high speed at which the device is capable of working, a brake for stopping same is sometimes desirable. The brake is shown at 28. 29 is a brake shoe carried by a shaft 30 in turn actuated by the lever 31 through the link 32.

The high speed of the device renders a tension necessary for the highest speed one of conventional form is shown at 24.

Only one form of this device is shown for the sake of clearness, but as it is either wholly or in part applicable to various classes of winding machines, I do not limit my claims to the described form.

Having now described my invention I wish to claim.

1. In an armature winding machine the combination of means for winding an armature with wire directing guides that act principally against head forming portions of said wire.

2. In an armature winding machine the combination of means for supporting an armature in position for winding, with a wire directing guide whose leading end is located away from the armature, thence approaching the opposite end of said armature in a manner not to deform the portions of said wire which enter the slots of the armature being wound.

3. In an armature winding machine the combination of jaws having a narrow beveled edge or finger nail for gripping the armature arranged to present the beveled edge to the work, with a back stop, said bevel tending to hold the said work against said back stop.

4. In a winding machine means for winding twisted coils consisting of the combination of angularly adjustable holding jaws with wire directing guides imposed thereon.

5. In a winding machine means for winding twisted coils consisting of the combination of angularly adjustable holding jaws with adjustable wire directing guides imposed thereon.

6. In an armature winding machine the combination of means for holding an armature in position for winding, with wire directing guides, each guide being formed of two or more portions, a base or jaw, an extension guide or wing, the leading end of the jaw being offset away from the said wing, the leading end of the wing being offset away from said jaw, thence approaching the opposite end of the jaw, so that no portions of said wing contact with the slot filling portions of said wire.

7. In an armature winding machine the combination of a jaw having a wire directing guide thereon and a wing adjustably mounted upon said jaw.

8. In an armature winding machine the combination of means for holding the object as an armature or stator in position to be wound, wire directing guides, means for forming loops to be used as leads, and means for twisting said leads.

9. In an armature winding machine the combination of means for holding the object as an armature or stator in position to be wound, wire directing guides, means for forming loops to be used as leads, means for twisting said leads, and means for positioning said twist.

10. In an armature winding machine the combination of means for winding an armature with means for forming and twisting the leads of said armature.

11. In an armature winding machine a wire directing curved guiding surface and a loop former carried thereby.

12. In an armature winding machine the combination of a wire directing curved guide with a pin of an angular section mounted thereon around which a loop may be formed.

13. In an armature winding machine a lead former combining a guide for directing the lead forming wire at or near the base of said lead, with a projection adjacent thereto, over which the said lead may be formed.

14. In an armature winding machine a winding head, armature holding means thereon, and a lead former consisting of means for locating the base of said lead combined with a projection over which the said lead may be formed, said projection being located to the rear of the base of said lead.

15. In an armature winding machine a wire directing guide, combined with a lead former, consisting of a lead directing guide slot L located suitably with reference to said guide and a projection located adjacent to said lead guide over which to loop said lead.

16. In a winding machine, a lead former, combining a wire directing guide M having a slot L therein and a rotatable element carrying a projecting portion to loop the wire over.

17. In a winding machine, a wire directing guide combined with a lead former comprising a rotatable element, having a lead directing slot in the end thereof, a projection adjacent thereto over which to loop said lead with means for locking said rotatable element at a predetermined point of rotation.

18. In a winding machine a lead former and twister, having a pin over which to form the lead, a rotatable element supporting said pin, and means for manipulating said lead attached to said element at a point between said pin, and the origin of said lead.

19. In a winding machine a lead former and twister, having a pin over which to form the lead, a rotatable element supporting said pin, means for manipulating said lead, attached to said element at a point between said pin, and the origin of said lead, and means for locking said element in a predetermined position.

20. In a winding machine a lead former and twister having a rotatable element, a pin, a locking device, a handle, a manipulating device having a slot, all attached to said element, and guides for directing the loop forming wire into the said slot of said manipulating device and means for holding the said elements in proper co-relation.

21. In a winding machine a lead former and twister combining a rotatable member, a handle and a locking device co-operating with said handle.

22. In an armature winding machine a locking device consisting of a supporting member, a shaft, a member pivoted to said shaft in a manner to admit of transverse oscillation of said member on said shaft, means for yieldably securing said oscillating member in a predetermined position, said oscillating member carrying a notched annular collar or flange, a pin secured to the supporting portion adapted to engage the notch in said collar and disengage it upon deflection of said oscillating member from its position of rest.

23. In a winding machine the combination of means for winding wire, means for forming a lead, means for twisting said lead and means for advancing said twist to a desired portion of said lead.

24. In a winding machine the combination of means for winding wire, a lead twister, having surfaces adapted to contact with or engage the lead forming wire, and means for passing the lead over the surfaces in a manner tending to forward irregularities as a twist in said lead towards a desired portion.

25. In a winding machine the combination of means for winding wire a lead twister, having a surface adapted to contact with or engage a lead forming wire, said surface being roughened as by corrugation angularly to said lead.

26. In a winding machine the combination of means for winding wire, and a lead twister having friction surfaces adapted to contact with or engage lead forming wire, said surface being provided with means for obtaining a high contact driving power.

27. In a winding machine the combination of means for twisting a lead with means for stretching said lead.

28. In a winding machine the combination of wire directing guides, means for forming and twisting leads and means for stretching said leads, that they may be easily released from said device.

29. In an armature winding machine the combination of means for forming the leads to electrical windings, with means for removing insulation from said leads.

30. In an armature winding machine, an armature holding chuck, an adjustable stop for resetting the position of said armature in said chuck, said stop consisting of a rack, a pinion, an actuating device, and means for holding said stop in any selected position.

31. In an armature winding machine the combination of an adjustable chuck, a manipulating hand wheel rotatable about the axis of said chuck and wire directing guides on said chuck.

32. In an armature winding machine the combination of an adjustable chuck, a manipulating hand wheel rotatable about the axis of said chuck, and wire directing guides on said chucks, with means for forming leads of the wire.

33. In an armature winding machine, means for adjusting the armature gripping jaws in the plane of their face, consisting of a jaw body grooved for holding the said gripping jaws combined with a slot in one of the said elements and a pin secured to the other of said elements playing in said slot.

34. In an armature winding machine the combination of a machine for winding drum armatures with means for forming or curving the wire before being fed to the said machine to make it lie straight in the slots of the armature.

35. In an armature winding machine the combination of means for winding a drum armature and a guide around which the wire fed to the machine is passed in order to give it a curve in a predetermined direction to make it lie straight in the slots of the armature.

36. In an armature winding machine the combination of means for winding an armature, a guide around which the wire fed to the machine is passed in order to give it a curve in a predetermined direction to make it lie straight in the slots of the armature, said guide being flexibly mounted, to aid in taking up irregularities in the pull on the wire caused by irregularities in the work being wound.

37. In an armature winding machine the combination of means for winding an armature with means for imparting a predetermined curve to the wire being used, a head of the winding machine, with means on the winding head for preserving the said curves in those portions of the wire which enter the slots of the work being wound to enable the said curved portions of the wire to be laid straight in the slots.

38. In a winding machine the combination of a lead former and twister, having a pin over which to form the lead, a rotatable element supporting said pin and means attached to said element for manipulating said lead consisting of a head carrying a slot cut diagonally to the said head when in position on the said lead forming device.

In testimony whereof I have signed my name to this specification in the presence of two subscribing witnesses.

PENROSE E. CHAPMAN.

Witnesses:
JUSTINE E. KOSSMAN,
O. W. GERLEMAN.